Figure 1:
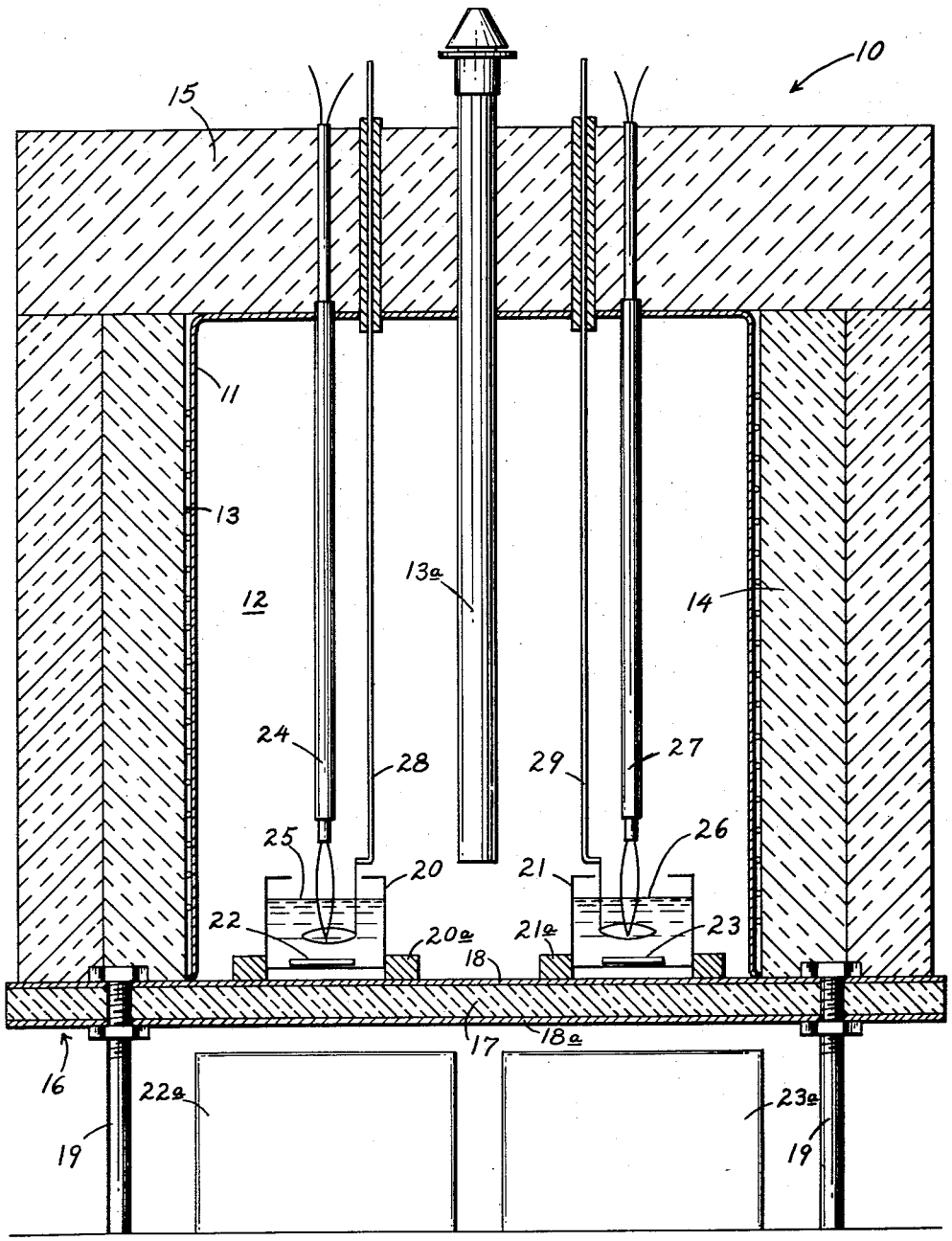

Feb. 27, 1962

J. A. J. STOLWIJK 3,022,664

DIFFERENTIAL CALORIMETER

Filed Sept. 22, 1958

2 Sheets-Sheet 1

INVENTOR.
JAN A.J. STOLWIJK

BY

*Brumbaugh, Free, Graves & Donohue*

ATTORNEYS.

United States Patent Office 3,022,664
Patented Feb. 27, 1962

3,022,664
DIFFERENTIAL CALORIMETER
Jan A. J. Stolwijk, Guilford, Conn., assignor to John B. Pierce Foundation, New Haven, Conn., a corporation of New York
Filed Sept. 22, 1958, Ser. No. 762,339
9 Claims. (Cl. 73—190)

This invention, generally, relates to a method and to an apparatus for determining the specific heat of materials such as fluids and, more particularly, to a method and apparatus for determining specific heat with a high degree of accuracy at elevated temperatures.

Several methods are available for measuring the specific heat of fluids, but such methods involve the measurement of the amount of heat absorbed or released by a known amount of fluid during a known change in temperature. One of these prior methods brings a known quantity of fluid at a known temperature into thermal contact with a substance of known weight, specific heat and temperature. The resulting equilibrium temperature permits computation of the specific heat of the fluid. Although basically simple, this method presents a considerable number of difficulties at higher temperatures.

In the adiabatic type of calorimeter, the fluid under test is heated, usually by a known amount of electrical energy, and heat losses are eliminated by simultaneously increasing the temperature of the environment by the same amount. This method, also, presents disadvantages when higher temperatures are involved.

Another method which has been suggested in the past utilizes the differential rate of heating or cooling by thermol leakage. The rate of change in temperature depends on such factors as the quantity of the substance, surface areas, the nature of the surface, and the difference in the temperatures of the substance and the temperature of the environment. In this method, it is required that at least two samples be used, one sample being of known specific heat.

The present invention has for one of Its objects the provision of a new and improved method for determining specific heat of fluids and the provision of an apparatus for carrying out the method.

Another object of the invention is to provide a calorimeter having sufficient sensitivity to produce analytical data from relatively small quantities of material at elevated temperatures.

The method of the invention involves the measurement of instantaneous temperature difference between two test samples of the same material after a known amount of heat has been applied to one of the test samples for a predetermined period of time, the temperature of the environment being maintained at a predetermined value. A standard liquid of which the specific heat is accurately known is not required.

One important advantage of this method is the differential feature which eliminates or minimizes difficulties experienced heretofore with other methods such as, for example, heat leakage, evaporation, and difficulties of absolute accuracy in measurements at high temperatures.

Another important feature of the invention is that specific heats may be obtained at any temperature between ambient and approximately 1100° F. without reduction in accuracy. This 1100° F. value is determined by the structural materials of the particular apparatus and may be increased by substituting other materials having more effective heat insulation characteristics.

In accordance with the invention, a thermally insulated chamber is adapted to contain two test samples of a material, the specific heat of which is to be determined at a desired temperature. Electrical connections are provided to heat each of the test samples separately and also to heat the interior of the chamber to a selected temperature. In addition, a temperature measuring arrangement is provided to indicate the temperature of each test sample and the temperature within the chamber. By appropriate computation which will be described in detail presently, the value of the specific heat is determined. The overall apparatus is simple in construction and relatively small and inexpensive to build. Moreover, the accessory instruments required are available in most laboratories.

The apparatus of the invention may take various forms, only one embodiment thereof being described herein for illustrative purposes. It should be understood, therefore, that the specific description should not be construed in a limiting sense.

Other and more specific objects will become apparent as the description proceeds.

Figure 2:
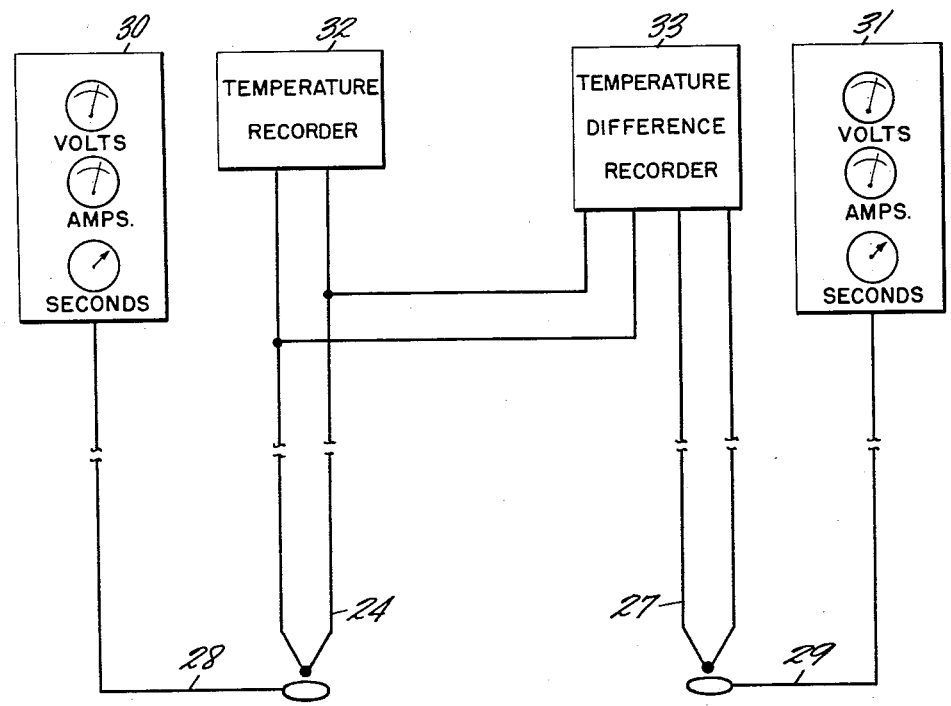

The invention will be understood more fully by referring to the following detailed description taken in conjunction with the accompanying figures of the drawings in which:

FIGURE 1 is an elevation view partly in section of a differential calorimeter constructed in accordance with the principles of the invention; and FIGURE 2 is a schematic diagram of the measuring mechanisms for the differential calorimeter illustrated in FIGURE 1.

Referring now to one form of apparatus suitable for carrying out the above method, reference is made to the calorimeter 10 shown in the drawing. In this arrangement of the calorimeter, a housing of cylindrical, stainless steel, identified by the numeral 11, forms a chamber 12 in which the temperature of the environment may be controlled accurately. Heat is applied to the chamber 12 by means of an electrical resistance heater winding 13 of, for example, nichrome wire rated for 1100 watts at 115 volts. During operation of the apparatus, a suitable thermostat 13a controls the electric current in the winding 13 and, thus, controls the environment temperature within the chamber 12. It is preferred that the coils of the heater winding 13 be in good thermol contact with the steel housing 11 but, at the same time, the winding 13 must be insulated electrically from the steel housing 11 to avoid an electrical short circuit.

Surrounding the housing 11 and heater 13 are several layers of thermal insulation 14 of any suitable material such as, for example, asbestos or glass wool. The top 15 of the apparatus is formed of a thickness of thermal insulation equal, at least, to the total thickness of the side wall insulation 14. In this arrangement, the heat developed by the heater winding 13 is controlled more accurately since circulating convection currents of air do not come into contact with the winding 13.

The steel housing 11 and the various thermal insulation layers 14 are supported on a bottom surface 16 which is formed of a thermal insulation material 17 interposed between supporting layers 18 and 18a of nonmagnetic material such as asbestos board. These layers 18 and 18a give added strength to the thermal insulation 17 and provide structural rigidity. The bottom surface 16, in turn, is supported on a plurality of legs 19, or by any other suitable means.

Within the chamber 12, two thin-walled metallic receptacles or cups 20 and 21 of good heat-conducting material are disposed in spaced-apart relation with respect to each other but at symmetrical positions with respect to the center line of the chamber 12. It is preferred that suitable guide markers 20a and 21a be fixed to the bottom surface 16 as shown in the drawing so that the cups are quickly and easily positioned correctly with respect to the center line of the chamber 12. These cups 20 and 21 are adapted to receive equal quantities of a single test material such as fluids 25 and 26, respectively.

The numerals 22 and 23 identify small, metallic stirring rods of good magnetic material disposed within the cups 20 and 21, respectively. Each of the stirring rods 22 and 23 is actuated by a standard magnetic stirrer 22a and 23a, respectively, positioned under the support 16 so that no physical connection with the rods is necessary.

An iron-constantan thermocouple 24 depends within the chamber 12 and is positioned in contact with the fluid 25. A similar thermocouple 27 is in contact with the fluid 26 as shown in FIGURE 1. In addition to thermocouple 24, a constantan heater coil 28 is immersed in the fluid 25, and a similar heater coil 29 is immersed in the fluid 26. These two small heating coils 28 and 29 are capable of delivering accurately measured, by two energy measuring mechanisms 30 and 31, amounts of heat to the respective fluids. One of these thermocouples is connected with a suitable temperature recorder 32, shown in FIGURE 2, having a range of, for example, 0 to 1100° F. A second recorder 33 is connected to record the difference in the voltage developed by the two thermocouples 24 and 27. Full scale deflection of this recorder, for illustrative purposes, is 500 microvolts, representing approximately 10° C. The recorder 32 thus indicates the test temperature, and the other recorder 33 indicates the temperature rise of one liquid as a result of the heat developed therein by the electrical heater.

As an example of a particular embodiment of the apparatus just described, the inside diameter of the cylindrical, stainless steel cover 11 is nine inches and the depth is eleven inches. The total thickness of the thermal insulation material surrounding the wire heater 13 is three inches, and the thickness of the base 16 on which the apparatus is supported is three-quarters of an inch. The two thin-walled cups 20 and 21 are made of aluminum or nonmagnetic stainless steel and are two inches in diameter and one and one-half inches high. The stirring rods 22 and 23 in the cups 20 and 21, respectively, are one inch long and one quarter inch in diameter.

In operation, the following characteristics are determined:

(1) Test temperature (indicated by recorder 32);
(2) Voltage drop and current in heater coil (V and $i$ indicated by one of the mechanisms 30 and 31);
(3) Time during which current flows (T in seconds indicated by one of the mechanisms 30 and 31);
(4) Temperature differential resulting from electrical heat input ($dt$) (indicated by the recorder 33);
(5) Water equivalent of cup and magnet at test temperature (W); and
(6) Weight ($w$) of the liquid in one of the cups.

The method of the invention is best illustrated by a specific example. In the following, the specific heat of Amyl Biphenyl is determined for a temperature of 519° F.

*Example*

With the method of the invention and the apparatus described above, the following information was recorded:

Test temperature _____ 519° F.
Electrical input _____ 6.10 volts; 0.510 amp.
Time of current flow _____ 209.5 seconds.
Temperature differential _____ 7.08° C.
Weight of liquid _____ 26.0 grams.
Heat capacity of cup and rod __ 4.28 g. cal./° C.

The specific heat is given by the equation $$C_p = \frac{\frac{Vit}{4.185} - W(dt)}{w(dt)}$$

where $C_p$—specific heat (g. cal./g./° C.)
V—voltage across heating coil (volts)
$i$—current through heating coil (amps)
$t$—time during which heat applied (seconds)
W—heat capacity of cup and stirring rod (g. cal./° C.)
$dt$—temperature difference between two cups (° C.)
$w$—weight of liquid in one cup Substituting the test information in the above equation, the following result is obtained:

$$C_p = \frac{\frac{6.10(0.510)209.5}{4.185} - 4.28(7.08)}{26.0(7.08)}$$

The accuracy of the apparatus is well within engineering requirements and can be improved, if desired, by substituting a thermopile for the thermocouples, by applying corrections for the heat developed in the ends of the heating coil which extend above the liquid, and other corrections well within the purview of those skilled in the art. In addition, the apparatus is simple and requires only small volumes of test fluids. Measurements made with the apparatus are easily obtained and are of a high degree of accuracy. Calibration of the apparatus is very seldom required. In addition, the apparatus and the method are applicable for use on both a scientific and a commercial scale.

The differential feature of the method in accordance with the invention largely eliminates the difficulties due to leakage of heat, drift of temperature, and evaporation. At a vapor pressure of 40 mm., differential evaporation will introduce an error of approximately 2%. In addition, there is no heat loss through the stirrer element because of the magnetic link. Readings made on the apparatus following the method of the invention are determined rapidly because of a thermal equilibrium reached quickly between the fluid cups and the walls of the calorimeter.

While the method and form of apparatus herein described constitute preferred embodiments of the invention, it is to be understood that the invention is not limited to this precise method and form of apparatus, and that changes may be made therein without departing from the scope of the invention which is defined in the appended claims.

I claim:

1. A calorimeter comprising a base of alternating layers of substantially rigid nonmagnetic material and thermally insulating material, a plurality of legs for supporting the base, an enclosure supported by the base, the enclosure having sides and a top of thermally insulating material, a metallic housing within the enclosure defining a chamber, a plurality of coils of electrically conductive wire surrounding the chamber and positioned between the metallic housing and the thermally insulating enclosure, a thermostat in communication with the chamber whereby electric current flow in the coils of electrically conductive wire is controlled to establish the temperature within the chamber at a predetermined value, two receptacles supported by the base within the chamber in symmetrical spaced-apart relation, guide means disposed on the base for positioning the respective receptacles, each receptacle being formed of good heat conducting material and being formed to receive a test material, two thermocouples, one thermocouple being positioned to be in thermal contact with a material in one receptacle and the other thermocouple being positioned to be in thermal contact with a material in the other receptacle, first and second heater means, the first heater means being positioned to apply a predetermined, accurately measured quantity of heat to a material in one receptacle, the second heater means being positioned to apply a predetermined, accurately measured quantity of heat to a material in the other receptacle, means connected to at least one of the first and second heater means for measuring the amount of heat added to the material in at least one of the receptacles, means responsive to the two thermocouples for measuring the temperature difference between the material in the two receptacles, a rod of magnetic material in each of the receptacles, and magnetic means disposed outside the chamber but adjacent each of the rods to cause each rod to rotate.

2. A method of determining specific heat of a material comprising placing two predetermined quantities of test samples of the same material within a constant temperature zone, maintaining the temperature within said zone at a predetermined value, applying a predetermined quantity of heat to one test sample for a predetermined time, and measuring the difference in temperature between the two test samples.

3. A method of determining specific heat of a material at a predetermined temperature comprising placing two predetermined quantities of test samples of the same material within an enclosure, maintaining the temperature within the enclosure at a predetermined value, applying a predetermined quantity of heat to one test sample for a predetermined time, measuring the difference in temperature between the two test samples, and maintaining a stirring action within the test samples during the heating interval.

4. A method of determining specific heat of a material at a predetermined, relatively high temperature comprising placing two substantially identical, predetermined quantities of test samples of the same material within an enclosure, applying heat to the enclosure to raise the temperature therein to a predetermined value, controlling the heat to maintain the temperature at the predetermined value, applying an accurately measured quantity of heat to one test sample for a predetermined period of time, and measuring the difference in temperature between the two test samples after a selected interval of time.

5. A calorimeter comprising an enclosure of a thermally insulating material having a base wall, side walls and a top wall, a heat conductive housing within said enclosure defining a chamber, heating means surrounding said chamber and positioned between said housing and said insulating enclosure for providing heat to said chamber, means in communication with said chamber to control said heating means to establish a temperature within said chamber at a predetermined value, a pair of receptacles supported by said base wall within said chamber in symmetrical spaced-apart relation relative to each other and to said housing, said receptacles being formed of a high heat conducting material and adapted to receive a test material, temperature measuring means positioned in thermal contact with the test material in each of said receptacles, heater means positioned to apply a predetermined accurately measured quantity of heat to the material in at least one of said receptacles, means connected to said heater means for measuring the amount of heat added to said material, and means responsive to said temperature measuring means for measuring the temperature difference between the material in said two receptacles.

6. A calorimeter comprising an enclosure of a thermally insulating material having a base wall, side walls, and a top wall, a metallic housing within said enclosure defining a chamber, heating means surrounding said chamber and between said housing and said insulating enclosure for providing heat to said chamber, means in communication with said chamber to control said heating means to establish a temperature within said chamber at a predetermined value, a pair of receptacles supported by said base wall within said chamber in symmetrical spaced-apart relation relative to each other and to said housing, said receptacles being formed of a high heat conducting material and adapted to receive a test material, temperature measuring means positioned in thermal contact with the test material in each of said receptacles to determine the temperature of the material in said receptacles, heater means to impart a measured quantity of heat to the material in said receptacles, means to distribute the heat imparted evenly throughout the material of each of said receptacles, means connected to said heater means for measuring the amount of heat imparted thereby, and means responsive to said temperature measuring means for measuring the temperature difference between the material in said two receptacles.

7. A calorimeter according to claim 6 and including guide means disposed on said base wall for positioning said receptacles.

8. A calorimeter according to claim 6 including stirring means of magnetic material in each of said receptacles, and means disposed outside of said chamber and adjacent each of said stirring means to cause said means to rotate.

9. A calorimeter according to claim 6 wherein said means to heat said chamber comprises a plurality of coils of electrically conductive wire surrounding said chamber and positioned between said housing and said thermal insulating enclosure.

References Cited in the file of this patent
UNITED STATES PATENTS

| | | |
|---|---|---|
| 2,733,602 | Jackson et al. | Feb. 7, 1956 |
| 2,800,793 | Oliver | July 30, 1957 |
| 2,911,824 | Czerlinsky et al. | Nov. 10, 1959 |

FOREIGN PATENTS

| | | |
|---|---|---|
| 682,822 | Great Britain | Nov. 19, 1952 |

OTHER REFERENCES

"Differential Calorimeter of The Tian-Calver Type" (R. W. Attree, R. L. Cushing, J. A. Ladd and J. J. Pieroni), The Review of Scientific Instruments, vol. 29, No. 6, June 1958, pages 491–496. (Photostat in 73–190.)

UNITED STATES PATENT OFFICE
CERTIFICATE OF CORRECTION

Patent No. 3,022,664 February 27, 1962

Jan A. J. Stolwijk

It is hereby certified that error appears in the above numbered patent requiring correction and that the said Letters Patent should read as corrected below.

Column 4, lines 6 to 10, the equation should appear as shown below instead of as in the patent:

$$C_p = \frac{\frac{6.10(0.510)209.5}{4.185} - 4.28(7.08)}{26.0(7.08)} = 0.681$$

Signed and sealed this 26th day of June 1962.

(SEAL)
Attest:

ERNEST W. SWIDER
Attesting Officer

DAVID L. LADD
Commissioner of Patents